United States Patent Office 3,491,073
Patented Jan. 20, 1970

3,491,073
PROCESS FOR THE POLYMERIZATION OF OLEFINS
Michael J. Marinak, Walnut Creek, Calif., assignor to The Dow Chemical Company, Midland, Mich., a corporation of Delaware
No Drawing. Filed Aug. 13, 1965, Ser. No. 479,640
Int. Cl. C08f 1/42
U.S. Cl. 260—80.78                                  10 Claims

ABSTRACT OF THE DISCLOSURE

Process for the production of ethylene polymers having improved flow properties in which ethylene and mixtures thereof with other copolymerizable monomers are polymerized in an inert solvent in a polymerization zone with a catalyst formed by separately feeding into the polymerization zone a stream of an alkyl aluminum compound mixed with a titanium chloride and a second stream of a metal compound such as titanium tetrachloride or vanadium acetylacetonate whereby a predetermined molar ratio of alkyl aluminum compound to metal compound is maintained in the polymerization zone.

---

The present invention relates to a process for the preparation of ethylene polymers and more particularly to a process for the preparation of ethylene polymers having improved flow characteristics.

The melt flow properties of ethylene polymers and copolymers of ethylene are very important for such commercial applications as bottle blowing, cast film, blown film and injection molding. One measurement which closely correlates with these properties is the $I_{10}/I_2$ ratio. $I_{10}$ is the melt index of the polymer determined at 190° C. with a 10 kilogram weight in accordance with ASTM D-1238-57T and $I_2$ is the melt index of the polymer determined also at 190° C. by this test but a weight of 2.16 kilograms is used. For a given $I_2$, increased $I_{10}/I_2$ ratios indicate that the ethylene polymer will flow more readily and an article fabricated from the polymer with the higher $I_{10}/I_2$ will have a smoother surface. In addition, ethylene polymers having increased $I_{10}/I_2$ ratios are considered to have a higher degree of shear sensitivity. High shear sensitivity is important to the plastics fabricator in that higher extrusion rates may be obtained for a given shear stress thereby improving the workability of the polymer, i.e. less work need be done on the polymer to obtain a given degree of output of the fabricated article.

The $I_{10}/I_2$ is believed to be dependent on the molecular weight range of the polymer i.e. the broader the molecular weight range the higher the $I_{10}/I_2$ ratio. The present practice in the art to increase the $I_{10}/I_2$ ratio of ethylene polymers is to mechanically blend polyethylene fractions of widely separate average molecular weights and relatively narrow molecular weight ranges. Such blending procedures necessarily increase the cost of the ethylene polymer and discourage the use of the polymer in applications wherein the polymer would otherwise be acceptable and desirable.

In accordance with the present invention ethylene polymers and copolymers of ethylene having improved flow properties are obtained by polymerizing ethylene and mixtures of a major proportion of ethylene and other copolymerizable monomers in a polymerization zone at a temperature above 120° C. in an inert solvent in which the resulting polymer is soluble at the polymerization temperature in the presence of a catalytic amount of a catalyst which is formed by separately feeding to the polymerization zone a first stream comprised of an admixture of an alkyl aluminum compound and at least one titanium chloride such as $TiCl_3$ or $TiCl_4$, the molar ratio of alkyl aluminum compound to titanium chloride being in the range of from about 1:10 to about 10:1 and a second stream comprising a metal compound selected from the group consisting of titanium tetrachloride and vanadium acetylacetonate and essentially free of organo-aluminum compounds, the rates of feeding and compositions of the separate streams introduced to the polymerization zone being adjusted to maintain the molar ratio of metal compound introduced per unit time by the second stream to alkyl aluminum compound introduced per unit time by the first stream at a ratio of from 1:100 to 1:1.

Monomers which can be copolymerized with a major proportion of ethylene according to the present invention include propylene, 1-n-butene, 3-methyl-1-butene, 1-n-pentene, 4-methyl-1-pentene, 1-n-hexene, butadiene and styrene. Particularly useful results are obtained from the polymerization of ethylene and copolymerization of ethylene and 1-butene.

The alkyl aluminum component of the catalyst mixture of the present invention can be represented by the general formula RAlYY' wherein R is alkyl, preferably containing from 1 to 12 carbon atoms; Y is selected from the group consisting of alkyl, preferably from 1 to 12 carbon atoms, and hydrogen; and Y' is selected from the group consisting of alkyl, preferably from 1 to 12 carbon atoms, hydrogen, and halogen such as chlorine, with the proviso that when Y' is halogen Y is alkyl.

Examples of compounds corresponding to the aforementioned formula which can be used include trimethyl aluminum, triethyl aluminum, triisobutyl aluminum, tri-n-butyl aluminum, tri-n-pentyl aluminum, triisooctyl aluminum, tri-n-dodecyl aluminum, diethyl aluminum chloride, diethyl aluminum hydride and the like. A particularly suitable heterogeneous catalyst system of this invention is one using titanium tetrachloride and triethyl aluminum.

The catalyst ingredients are combined in the polymerization zone in a particular and critical manner. In order to obtain ethylene polymers of improved melt flow properties according to the process of the present invention, it is essential that the catalyst ingredients be fed to the reaction zone in two separate streams, the first of which contains a mixture of an alkyl aluminum compound and at least one titanium chloride, and the second of which streams contains only titanium tetrachloride or vanadium acetylacetonate. Preferably, the catalyst-forming ingredients are fed to the reaction zone in the form of liquid streams, each of which comprises an inert liquid medium, generally one suitable for use as a polymerization medium, having the catalyst-forming ingredients dispersed or dissolved therein.

The alkyl aluminum compound and titanium chloride are mixed and dispersed in the inert liquid component of the first catalyst stream in a molar ratio of from about 1:10 to about 10:1, preferably from 1:1 to 5:1. The catalyst streams are fed separately to the polymerization zone at relative rates such that the ratio of moles of alkyl aluminum compound introduced in the first stream to the polymerization zone per mole of metal compound introduced thereto in the second stream is from about 1:1 to about 100:1 and preferably from 2:1 to 20:1, the improvement in melt flow ratios of the polymer being inversely proportional to the increase in the molar ratio. Molar ratios less than 1:1 are not desirable and result in reduced catalytic efficiency, poor polymerization temperature and melt index control.

This method of catalyst component addition and maintenance of specified molar ratios of catalyst ingredients forms a critical and essential feature of the present invention for if the catalyst components are all combined in one stream at molar ratios of alkyl aluminum compound to titanium chloride to metal compound equivalent to the amounts of catalyst components employed in the separate streams significant improvement of the flow properties of the resultant ethylene polymer is not obtained.

The concentration of the aluminum-containing catalyst component in the polymerization zone is usually in the range of 0.1 to 10.0 millimoles per liter of inert polymerization solvent charged to that zone.

The critical process conditions of the present invention also include effecting the polymerization at a temperature above 120° C., generally from about 120° C. to 200° C., in a liquid solvent which is inert under the conditions of the polymerization reaction and is a solvent for the ethylene polymer at the polymerization temperature employed. Ethylene polymers prepared under conditions other than the solution polymerization conditions delineated above, e.g. slurry polymerization, do not exhibit substantial improvement in melt flow properties.

Suitable inert solvents which may be employed in the process of the invention include saturated aliphatic (paraffin) hydrocarbons and cycloaliphatic (cycloparaffin) hydrocarbons. For convenient operation the paraffin hydrocarbon should contain from 5 to 20 carbon atoms. Examples of typical liquids are pentanes, hexanes, heptanes, octanes, cyclohexane, methylcyclohexane, ethylcyclohexane and mixtures thereof.

It is unnecessary to employ elevated pressures in order to bring about the polymerization according to the present invention. However, for convenience of handling normally gaseous olefins such as ethylene, it is advantageous to employ elevated pressures. Most suitably the present invention is carried out under a pressure between atmospheric and 105 kg./cm.$^2$ guage and preferably under a pressure in the range from 14 to 70 kg./cm.$^2$.

It is highly desirable that the catalyst streams be prepared and the subsequent polymerization be carried out in the substantial absence of molecular oxygen, carbon monoxide, carbon dioxide and water. The catalyst effectiveness is destroyed by reaction with oxygen, carbon monoxide, carbon dioxide, or water; and consequently, if any of these are present in excess, no polymerization will take place.

Molecular weight control agents such as hydrogen and zinc diethyl at concentrations of 0.01 to 10.0 weight percent of monomer feed may be introduced into the polymerization zone to modify polymer molecular weight.

The polymerization process may be carried out batchwise or continuously. The residence time used in a continuous process may vary widely from about 5 minutes to about 5 hours or more. In a batch process, the time for the reaction can also vary widely, such as from 15 minutes up to 24 hours or more.

Upon completion of the polymerization reaction, any excess monomer is vented and the contents of the reactor are then treated by any suitable method to inactivate the catalyst and remove the catalyst residues. In one method, inactivation of the catalyst is accomplished by washing with an alcohol such as methanol, n-propanol, isopropanol, water or other suitable materials. The polymer is then separated from the diluent, e.g. by decantation, filtration, or other suitable method, after which the polymer is dried.

The practice of this invention is best illustrated by the following examples. The techniques and conditions normally used in heterogeneous catalyst systems are suitable for the practice of this invention. These examples are given merely by way of illustration and are not intended to limit the scope of the invention in any way nor the manner in which the invention may be practiced.

Example 1

The polymerization of ethylene was carried out in accordance with the invention in a polymerization reactor comprising a vessel equipped with means for heating and agitation and means for feeding separate liquid and gas streams into the vessel. Means were also provided for drawing a stream of liquid polymerization solution from the vessel.

To the polymerization vessel were fed separate gas streams of hydrogen at the rate of 4.01 gram mole/hr., and purified ethylene at the rate of 342.47 gram mole/hr., and a separate solvent stream of Isopar D, a mixture of isoparaffins having a boiling range of 113–124° C. manufactured by the Humble Oil Company, at the rate of 550.77 gram mole/hr., and a first catalyst stream comprised of a mixture of 1.04 percent by weight triethyl aluminum (TEA) and 1.16 percent by weight $TiCl_4$ (molar ratio TEA:$TiCl_4$=1.5:1) dispersed in Isopar D at the rate of 9.526 gram mole/hr. Isopar D (or 0.0748 gram mole/hr. TEA, 0.499 gram mole $TiCl_4$). A second catalyst stream comprised solely of $TiCl_4$ dissolved in Isopar D (1.1 weight percent) was fed to the reactor at a rate of 22.68 gram mole/hr. Isopar D (or 0.1452 gram mole $TiCl_4$). This feed rate maintained the molar ratio of TEA in the first catalyst stream to $TiCl_4$ in the second catalyst stream at 5:1. The reaction vessel was heated to a temperature of 140° C. and the pressure maintained at 30.1 kg./cm.$^2$.

The polymerization solution which consisted primarily of a solution of polyethylene and unreacted ethylene was continually withdrawn from the reaction vessel at a rate of 132 liters/hr. and passed to a separator where the polymer solution was separated from the unreacted ethylene gas, the gas being separately purified and recycled. The polymer solution obtained from the separation was then washed with aqueous caustic to remove the catalyst residues. The solvent was then evaporated leaving a solid polymer product. The yield of polymer by this procedure was 6323.2 grams/hr.

The above procedure was repeated with the exception that the molar ratio of TEA in the first catalyst stream to $TiCl_4$ in the second catalyst stream was varied from 1.5:0 to 15:1, the molar ratio of TEA to $TiCl_4$ in the first catalyst stream remaining constant at 1.5:1.

The properties of the polyethylene prepared in accordance with the present invention by the above procedures are recorded in the table below. (Sample numbers 1–3.)

For purposes of contrast, the properties of polyethylene prepared in substantially the same manner as that described above with the exception that a second catalyst stream of $TiCl_4$ was not used are also summarized in the table below ($C_1$—Control sample that is, no $TiCl_4$ was included in a second stream).

TABLE

| Sample No. | Molar Ratio of TEA in 1st stream to $TiCl_4$ in 1st stream | Molar Ratio of TEA in 1st stream to $TiCl_4$ in 2nd stream | Properties of Polyethylene | | |
|---|---|---|---|---|---|
| | | | Density, g./cc. | Melt Index ($I_2$), decig./min. | Melt Flow Ratio ($I_{10}/I_2$) |
| 1 | 1.5:1 | 15:1 | 0.9584 | 1.3 | 12.5 |
| 2 | 1.5:1 | 7.5:1 | 0.9569 | 1.3 | 13.8 |
| 3 | 1.5:1 | 5:1 | 0.9562 | 1.3 | 15.7 |
| $C_1$ | 1.5:1 | 1.5:0.0 | 0.9584 | 1.3 | 9.5 |

Example 2

The polymerization of ethylene was carried out in accordance with the present invention following the procedure of Example 1 with the exception that the molar ratio of TEA to $TiCl_4$ in the first catalyst stream was adjusted to 2.7:1 and the rate of feed of the second catalyst to the polymerization reactor was adjusted so that the molar ratio of TEA in the first catalyst stream to $TiCl_4$ in second catalyst stream was maintained at 2.7:0.8.

At this molar ratio, the molar ratio of TEA to total $TiCl_4$ in the polymerization zone was 1.5:1.

The properties of the polyethylene obtained were as follows:

| | |
|---|---|
| Density, g./cc. | 0.961 |
| Melt index ($I_2$), decig./min. | 1.3 |
| Melt flow ratio ($I_{10}/I_2$) | 30.5 |

Example 3

The polymerization of ethylene was carried out in accordance with the present invention following the procedure of Example 1 with the following exceptions: (a) the molar ratio of TEA to $TiCl_4$ in the first catalyst stream was adjusted to 2:1 and (b) vanadium acetylacetonate was used as the metal compound in the second catalyst stream and the molar ratio of TEA in the first catalyst stream to vanadium acetylacetonate in the second catalyst stream was 2:0.1 (20:1).

The properties of the polyethylene obtained were as follows:

| | |
|---|---|
| Density, g./cc. | 0.956 |
| Melt index ($I_2$), decig./min. | 4.7 |
| Melt flow ratio ($I_{10}/I_2$) | 11.0 |

By way of contrast, the above procedure was repeated with the exception that the TEA $TiCl_4$ and vanadium acetylacetonate were admixed together in one catalyst stream at a molar ratio of 2/1/0.1, prior to introduction of the resulting mixture into the polymerization reaction zone.

The properties of the polyethylene obtained were as follows:

| | |
|---|---|
| Density, g./cc. | 0.950 |
| Melt index decig./min. ($I_2$) | 0.3 |
| Melt flow ratio ($I_{10}/I_2$) | 8.1 |

Example 4

A copolymer of ethylene and butene-1 containing 2.5 percent by weight butene-1 was prepared in accordance with the present invention following the procedure of Example 1, using separate catalyst feed streams, an admixture of TEA and $TiCl_4$ at molar ratio of 1.5:1 in the first stream, the $TiCl_4$ in the second catalyst stream being introduced into the polymerization reactor at a molar ratio of TEA in the first stream to $TiCl_4$ in the second stream of 2.13:1.

The resulting ethylene/butene-1 copolymer product had the following properties:

| | |
|---|---|
| Density, g./cc. | 0.944 |
| Melt index ($I_2$), decig./min. | 0.5 |
| Melt flow ratio ($I_{10}/I_2$) | 20.5 |

By way of contrast, an ethylene-butene-1 polymer prepared in a substantially identical manner as the copolymer of Example 4 except that the second $TiCl_4$ stream was not used had the following physical properties:

| | |
|---|---|
| Density, g./cc. | 0.944 |
| Melt index ($I_2$), decig./min. | 0.7 |
| Melt flow ratio ($I_{10}/I_2$) | 12.5 |

Example 5

The procedure of Example 1 was repeated to prepare a copolymer of ethylene and a mixture of $C_6$–$C_7$ alpha-olefins the copolymer containing 4 percent by weight of the $C_6$–$C_7$ alpha-olefins. The $C_6$–$C_7$ alpha-olefins monomer mixture used to prepare the copolymer had a density of 0.686 grams/milliliter and was comprised of the following distribution of alpha-olefins.

| Number of carbon atoms in alpha-olefin | Weight percent of alpha-olefin in mixture |
|---|---|
| 5 | 2 |
| 6 | 71 |
| 7 | 25 |
| 8 | 2 |

Separate catalyst streams were introduced into the polymerization reactor. The first catalyst feed stream contained triethyl aluminum and $TiCl_4$ at a molar ratio of 2:1. The second catalyst stream containing $TiCl_4$ was introduced in the polymerization reactor at a rate so as to maintain the molar ratio of triethyl aluminum in the first stream to $TiCl_4$ in the second stream at 2.8:1.

The resulting ethylene/$C_6$–$C_7$ alpha-olefin copolymer had the following properties:

| | |
|---|---|
| Density, g./cc. | 0.938 |
| Melt index ($I_2$), decig./min. | 2.9 |
| Melt flow ratio ($I_{10}/I_2$) | 19.4 |

By way of contrast, an ethylene/$C_6$–$C_7$ alpha-olefin copolymer prepared in a substantially identical manner as the copolymer of Example 5 with the exception that the second $TiCl_4$ stream was not used had the following physical properties:

| | |
|---|---|
| Density, g./cc. | 0.930 |
| Melt index ($I_2$), decig./min. | 2.5 |
| Melt flow ratio ($I_{10}/I_2$) | 9.4 |

Example 6

A copolymer of ethylene and propylene containing 2 percent by weight propylene was prepared in accordance with the present invention following the procedure of Example 1, using separate catalyst feed streams, an admixture of TEA and $TiCl_3$ at molar ratio of 10:1 in the first stream and $TiCl_4$ in the second catalyst stream, being introduced into the polymerization reactor at a molar ratio of TEA in the first stream to $TiCl_4$ in the second stream of 10.0:0.75.

The resulting ethylene/propylene copolymer product had the following properties:

| | |
|---|---|
| Density | 0.947 |
| Melt index ($I_2$), decig./min. | 0.7 |
| Melt flow ratio ($I_{10}/I_2$) | 12.1 |

By way of contrast, an ethylene/propylene copolymer prepared in a substantially identical manner as the copolymer of Example 6, except that the separate $TiCl_4$ stream was not used, had the following physical properties:

| | |
|---|---|
| Density, g./cc. | 0.945 |
| Melt index ($I_2$), decig./min. | 0.8 |
| Melt flow ($I_{10}/I_2$) | 9.0 |

Example 7

The procedure of Example 1 was repeated to prepare a copolymer of ethylene and $C_6$–$C_7$ alpha-olefin containing 2 percent by weight $C_6$–$C_7$ alpha-olefins.

Separate catalyst streams were introduced into the polymerization reactor. The first catalyst feed stream contained triethyl aluminum, $TiCl_3$ and $TiCl_4$ at a molar ratio of 10/1/5 respectively. The second catalyst stream containing $TiCl_4$ was introduced into the polymerization reactor at a rate so as to maintain the molar ratio of TEA in the first stream to $TiCl_4$ in the second stream at 2:1.

The resulting ethylene/$C_6$–$C_7$ alpha-olefin copolymer had the following properties:

| | |
|---|---|
| Density, g./cc. | 0.948 |
| Melt index ($I_2$), decig./min. | 3.5 |
| Melt flow ratio ($I_{10}/I_2$) | 16.4 |

By way of contrast, an ethylene/$C_6$–$C_7$ alpha-olefin copolymer prepared in a substantially identical manner as the copolymer of Example 7, with the exception that the second $TiCl_4$ stream was not used, had the following physical properties:

| | |
|---|---|
| Density, g./cc. | 0.947 |
| Melt index ($I_2$), decig./min. | 1.2 |
| Melt flow ratio ($I_{10}/I_2$) | 8.2 |

Results similar to the foregoing may also be obtained in accordance with the process of the present invention when any other of the mentioned olefins are polymerized with catalyst mixtures of the kind mentioned above when the catalyst components as specified introduced into the polymerization zone in an equivalent manner and at equivalent molar ratios.

What is claimed is:

1. A process for the preparation of polymers of ethylene which comprises polymerizing a monomeric material selected from the group consisting of ethylene and mixtures of a major portion of ethylene and other copolymerizable hydrocarbon monomers in a polymerization zone at a temperature above 120° C. in an inert hydrocarbon solvent in which the resulting polymer is soluble at the polymerization temperature, in the presence of a catalytic amount of a catalyst which is formed by separately feeding to the polymerization zone (1) a first stream comprised of an admixture of an alkyl aluminum compound having the general formula RAlYY' wherein R is an alkyl radical having from 1 to 12 carbon atoms and Y is selected from the group consisting of alkyl radicals having from 1 to 12 carbon atoms and hydrogen and Y' is selected from the group consisting of alkyl radicals having from 1 to 12 carbon atoms, hydrogen and halogen, with the proviso that when Y' is halogen, Y is an alkyl radical and a chloride of titanium selected from titanium trichloride and titanium tetrachloride and mixtures thereof, the molar ratio of alkyl aluminum compound to titanium chloride being in the range of from about 1:10 to about 10:1 and (2) a second stream comprising as the sole metal constituent a metal compound selected from the group consisting of titanium tetrachloride and vanadium acetylacetonate, the rate of feeding of the separate streams into the polymerization zone being adjusted to maintain the moles of said compound fed in the second stream per mole of said alkyl aluminum fed in the first stream at a ratio of from 1:100 to 1:1.

2. The process of claim 1 wherein the monomeric material consists essentially of ethylene and propylene.

3. The process of claim 1 wherein the monomeric material consists essentially of ethylene and butene-1.

4. The process of claim 1 wherein the monomeric material consists essentially of ethylene and mixed $C_6$–$C_7$ alpha-olefins.

5. The process of claim 1 wherein the inert solvent is an aliphatic hydrocarbon.

6. The process of claim 1 wherein the alkyl aluminum compound is triethylaluminum.

7. The process of claim 1 wherein the titanium chloride is titanium tetrachloride.

8. The process of claim 1 wherein the titanium chloride in the first stream is titanium trichloride.

9. The process of claim 1 wherein the metal compound in the second stream is titanium tetrachloride.

10. The process of claim 1 wherein the metal compound in the second stream is vanadium acetylacetonate.

References Cited

UNITED STATES PATENTS

| | | |
|---|---|---|
| 2,886,560 | 5/1959 | Weber et al. |
| 3,108,094 | 10/1963 | Morgan. |
| 3,271,372 | 9/1966 | Coywood _____ 260—80.18 |
| 3,345,431 | 10/1967 | Harban. |

FOREIGN PATENTS

| | | |
|---|---|---|
| 684,717 | 4/1964 | Canada. |
| 836,588 | 6/1960 | Great Britain. |

JOSEPH L. SCHOFER, Primary Examiner

U.S. Cl. X.R.

260—88.2, 94.9